March 5, 1957 W. C. CLEAVE 2,783,865
MEANS FOR HANDLING SHORT DISTANCE RIDERS ON FARE VEHICLES
Filed Feb. 14, 1952 3 Sheets-Sheet 1
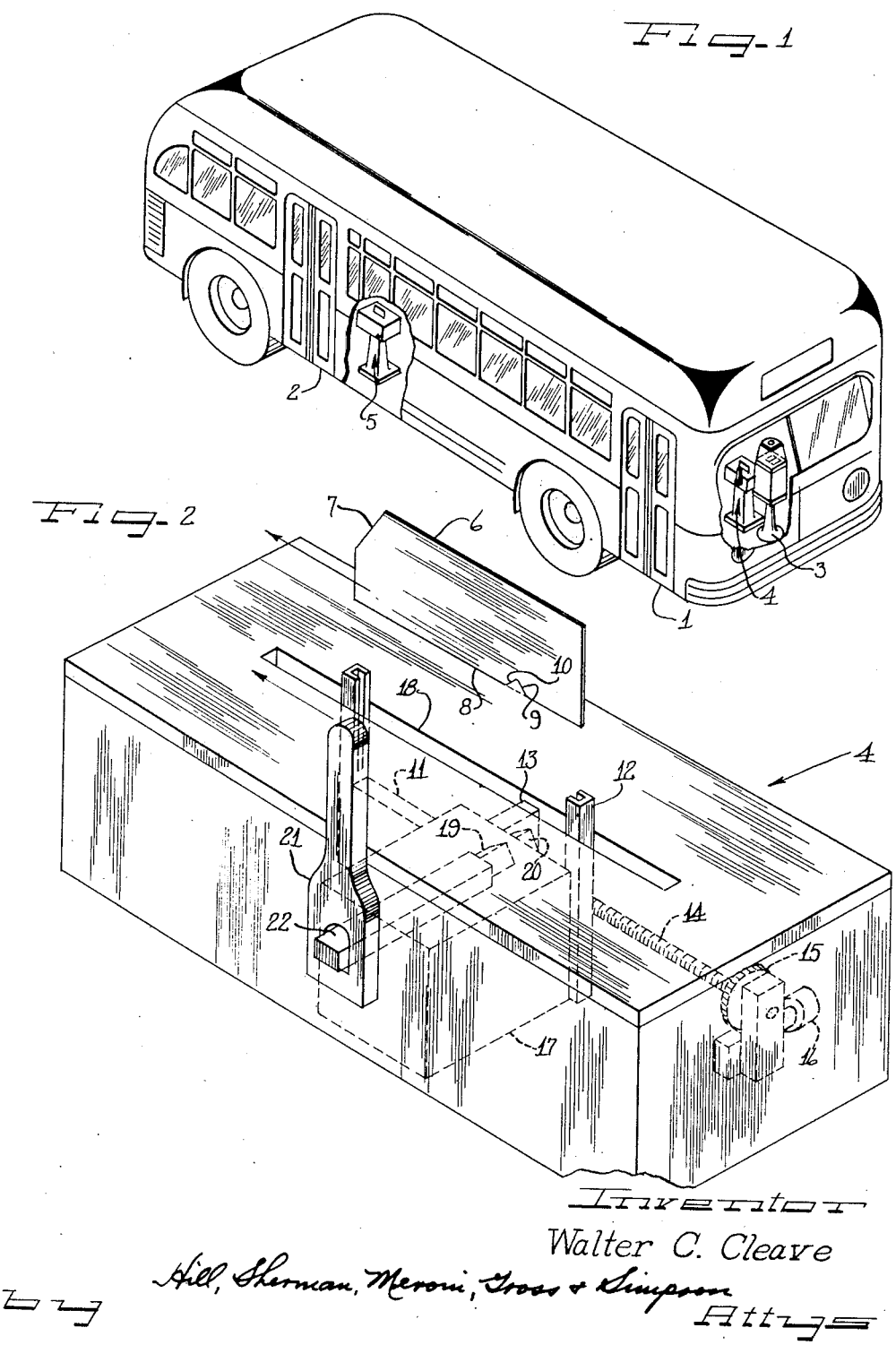
Inventor
Walter C. Cleave

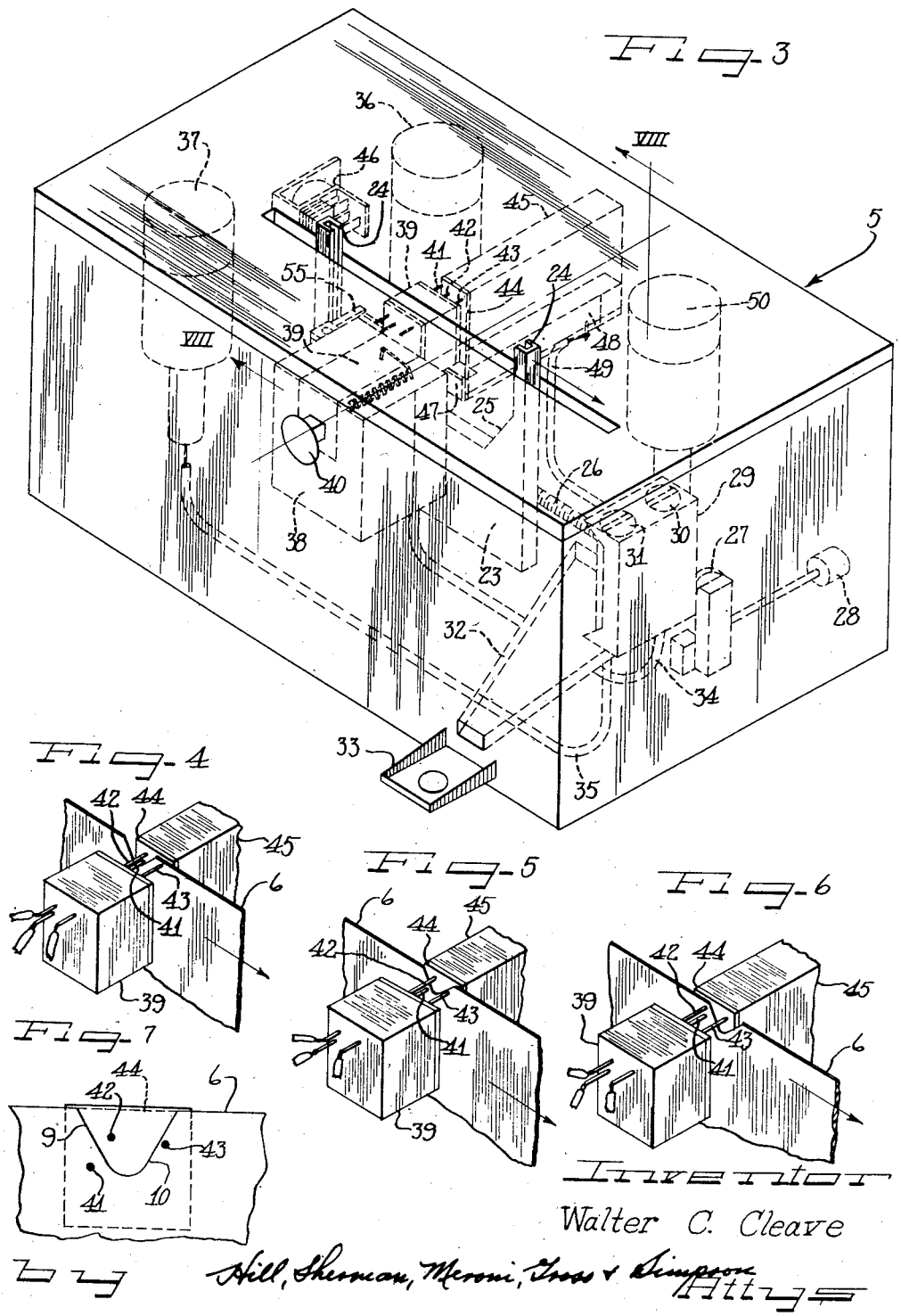

March 5, 1957     W. C. CLEAVE     2,783,865
MEANS FOR HANDLING SHORT DISTANCE RIDERS ON FARE VEHICLES
Filed Feb. 14, 1952     3 Sheets-Sheet 3
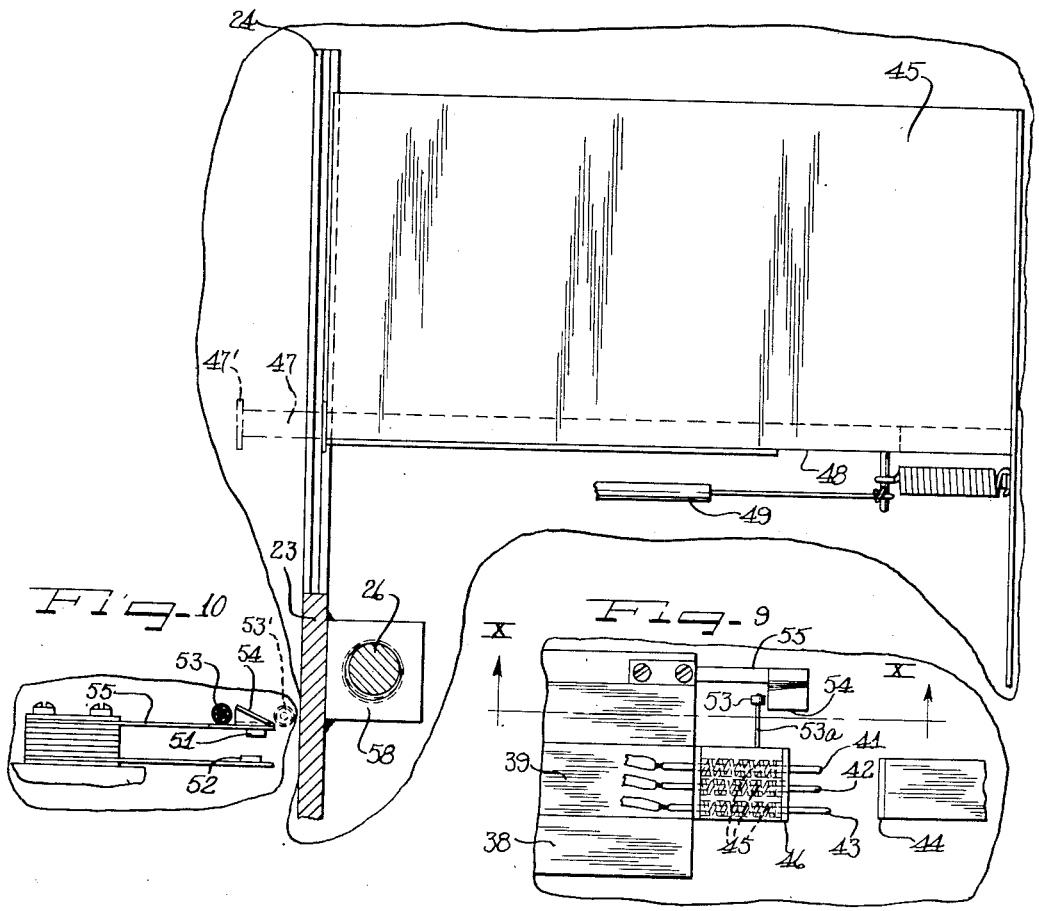
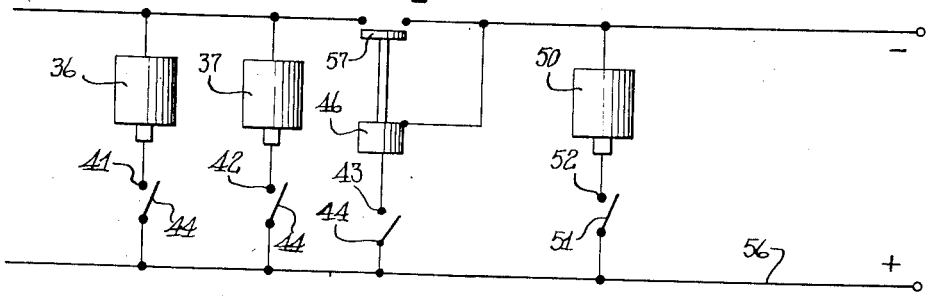
Inventor
Walter C. Cleave
by Hill, Sherman, Meroni, Gross & Simpson
Attys

United States Patent Office 2,783,865
Patented Mar. 5, 1957

2,783,865

MEANS FOR HANDLING SHORT DISTANCE RIDERS ON FARE VEHICLES

Walter C. Cleave, Wilmette, Ill., assignor of one-fourth to Kenneth J. Tobin, Sarasota, Fla.

Application February 14, 1952, Serial No. 271,538

6 Claims. (Cl. 194—4)

This invention relates to a method and mechanism for equitably apportioning transit vehicle fares among passengers traveling different distances. The invention is particularly useful in the control of fares on commuter trains, street cars, busses and other transit vehicles making numerous stops, especially local urban systems. In transit systems now in general use, fares are apportioned by one of two general methods. According to the first method, all passengers are charged the same fare regardless of the distance traveled. This system is obviously inequitable to persons intending to ride a short distance and because of this, many potential short haul passengers refrain from using the service entirely. Under the second system passengers purchase tickets, the price of which is proportional to the length of trip desired. This requires complicated ticket printing machinery as well as a conductor aboard the vehicle to prevent passengers from overtraveling their tickets. It is apparent that the second of these systems is more equitable to the passenger desiring to travel a short distance. However, it is also more expensive to the transit company and this extra expense will, of course, be reflected in higher overall rates to the public.

It is accordingly an object of this invention to provide a system in which short haul passengers are charged an appropriately small fare, yet in which no conductors or ticket-takers are required.

Another object is to provide a means and method of handling fares on transit vehicles wherein the maximum charge is collected initially and wherein a passenger riding only a short distance may be returned an unearned portion of his fare.

A further object is to provide a fare system in which short trip passengers are not penalized by required payment of a full fare for a short distance.

Yet another object of the invention is to provide an extremely simple and inexpensively operated fare system which requires no conductor yet which provides for reduced fare trips.

A further feature of the invention resides in the provision of means for handling fares on public transit vehicles, arranged to proportion the fare charges in keeping with the distance traveled, which means are operable by simple manual manipulations on the part of the passenger, require little or no attention when in use, and only simple servicing in the nature of replenishing cards or coins.

Still a further feature of the invention is the provision of a new and novel method of accommodating short distance riders on public vehicles.

Many other features, advantages and additional objects of the present invention will become apparent to those versed in the art upon reference to the detailed description which follows and the accompanying sheets of drawings in which a preferred structural embodiment incorporating the principles of the present invention is shown by way of illustrative example.

On the drawings:

Figure 1 is a view of a common transit vehicle equipped with applicant's invention which is arranged as shown at the cutaway portions;

Figure 2 discloses applicant's novel card punching mechanism with a card already punched thereby indicating the point at which the passenger embarks;

Figure 3 discloses applicant's novel change return mechanism which is located at the vehicle exit;

Figures 4, 5 and 6 are fragmentary views showing a punch card as it would appear in the change dispensing machine when inserted at different points of exit along the vehicle route;

Figure 7 is an end view of the contact pin structure used in applicant's novel change dispensing mechanism;

Figure 8 is an enlarged fragmentary sectional view taken along lines VIII—VIII of Figure 3 and disclosing more clearly the card disposal knockout unit of the change dispensing mechanism;

Figure 9 is a plan view of the change dispensing and card knockout control switches used in applicant's change dispensing mechanism shown in Figure 3;

Figure 10 is an elevation view partially in cross section of the card knockout switch, taken along lines X—X of Figure 9; and Figure 11 discloses the electrical circuit arrangement used with applicant's novel change dispensing mechanism.

As shown on the drawings:

One of the most common transit vehicles in use today is the bus. In the drawings, applicant has disclosed the installation of his invention on such a bus, but it is, of course, understood that any other common transit vehicle could be used equally as well.

In Figure 1 is shown the common transit bus having an embarkation door 1 and an exit door 2. At a point near the embarkation door, the usual fare box 3 is situated. Immediately adjacent thereto is located applicant's novel card punching mechanism generally indicated by numeral 4. Immediately adjacent the exit door 2 is located applicant's novel change returning mechanism generally indicated by numeral 5.

In Figure 2, the details of applicant's novel card punching machine are more clearly shown. The mechanism is designated to punch the card generally indicated at 6. Card 6 is preferably constructed of relatively stiff material such as paper or cardboard and is generally rectangular in configuration. One corner of the card, as indicated at 7, has been removed for purposes to be disclosed later. The card punching mechanism 4 herein disclosed is designed to perforate the lower edge 8 of the card 6, leaving a wedge-shaped notch indicated by the lines 9 and 10.

The card punching mechanism consists of a card carrying frame 11 having vertical upright, grooved arms 12. The member 11 is fixedly secured to block 13 which has a threaded bore therein designed to receive a rotating lead screw 14. The screw 14 is rotatably driven through gearing 15 by a coupling 16 which is connected to a common speedometer shaft which is preferably connected to one of the front wheels of the transit vehicle. This arrangement produces rotation of screw 14 in proportion to the true distance traveled by the vehicle. Rotation of the screw member 14 will, through block 13, cause reciprocation of the frame 11 along the path indicated by the slot 18. Fixedly secured to the base of the device is a support structure 17 in which is slidably mounted a card punch member 19. The member 19 is reciprocated along its length by means of a handle 21 connected thereto at 22. A punch seat member 20 is fixedly secured to the support 17 and cooperates with the punch member 19 to perforate a card held in the grooved arms 12 when the handle 21 is operated.

In Figure 3 the details of the change return mechanism are more clearly shown.

A traveling frame 23 is provided with card support arms 24. The lower right-hand corner of the opening between arms 24 has been filled in as shown at 25. The portion 25 cooperates with the edge 7 of card 6, allowing card 6 to be inserted in the frame 23 in only one position. As in the case of the card punch mechanism, the card frame 23 is reciprocated by a lead screw 26 which is rotated through gearing 27 by coupling 28 which is connected to coupling 16, thus synchronizing the card punch and coin return mechanism to each other.

Change dispensing tubes 30 and 31 are mounted in a housing 29. These tubes are actuated by Bowden wires shown, respectively at 34 and 35. A solenoid 36 is provided for the operation of Bowden wire 34 while an identical solenoid 37 is provided for the operation of Bowden wire 35. Upon the operation of one or both of said solenoids the tubes 30 and 31 are selectively operated, thereby dispensing change into chute 32 which leads to the receptacle 33 from which it is removed by the passenger.

For purposes of illustration only, dispensers 30 and 31 are designed to dispense nickels.

It is to be understood, however, that other denominations could easily be substituted therefor.

To control the actuation of the coin dispensers, a contact carrier 39 is reciprocably mounted in fixed support 38 and is adapted to be operated by the knob 40. Contact pins 41, 42 and 43 are supported by and insulated from member 39. A contact plate 44 is carried by fixed member 45 and is normally separated from said pins 41, 42 and 43 by a space slightly larger than the thickness of card 6. As may be seen from Figure 9, the pins 41, 42 and 43 are resiliently held by springs 45 in a normal axial position determined by plate 46. It will also be noted that pin 43 is somewhat longer than pins 41 and 42, the reason for which will be discussed later. In the embodiment shown, the pins are staggered with relation to member 39 as disclosed in Figure 7.

To collect used cards a card knockout head 47 is fixedly attached to bar 48 reciprocably mounted in member 45. Reciprocation of the bar 48 is accomplished by means of the solenoid 50 which operates Bowden wire 49 which is in turn connected to the bar 48. When the solenoid 50 is energized, the member 47 reciprocates to the left in Figures 3 and 8 forcing the card 6 from the groove in the arms 24, and allowing the card to fall into a receptacle placed at the bottom of the container.

Figure 8 more clearly shows the construction and operation of the card knockout device. The solid lines show member 47 in its normal position. Upon operation of the solenoid 50, the bar 48 is moved to the left in Figure 8 by means of Bowden wire 49 bringing the head 47 into a position shown by the dotted lines at 47'. This action bends the card 6 sufficiently to force it from the grooves in the arms 24.

Switch mechanism for operation of the solenoid 50 is shown in detail in Figures 9 and 10. A roller member 53 is fixedly supported on a rod 53a projecting from the reciprocating member 39. A switch contact 51, for cooperation with a contact 52 therebeneath, is resiliently mounted by means of spring 55 to the fixed support member 38. An angularly and laterally disposed plate member 54 is affixed to the contact 51. Looking now at Figures 9 and 10 it will be seen that inward movement of the member 39 will move roller 53 to the right. During this movement, the roller 53 will pass under the angularly disposed plate 54 forcing it upwardly until the member 53 has completely passed under the plate 54 at which time the plate 54 will again resume the position indicated in Figure 9. At this stage of the operation, the position of roller 53 is shown in dotted lines at 53' (Figure 10). Upon release of the member 39, member 39 with roller 53 will move to the left to assume their original positions. During this return stroke, the roller 53 will pass above the plate 54 and deflect it downwardly into contact with the member 52 thus completing the energizing circuit to the solenoid 50.

Figure 11 shows in schematic form, the electrical circuit used in applicant's novel coin return mechanism. From any convenient source of electricity, current flows along wire 56 to the contact bar 44 indicated here as three separate contacts 44 for the sake of clarity. The contact of the pins 41, 42 and 43 with the plate 44 will respectively energize coin dispensing solenoids 36 and 37 or relay solenoid 46. As it has been explained before, the pin 43 is of greater length than the pins 41 and 42. Accordingly, if bar 39 is reciprocated any time when a card 6 is not between the contacts 41, 42 and 43 and the contact 44, the solenoid 46 will be energized before either solenoids 36 and 37. Energization of solenoid 46 will actuate the normally closed switch bar 57 to open the circuits of the solenoids 36 and 37 as shown in Figure 11 so that no coins are dispensed even though contacts 41 and 42 subsequently close with plate 44. Card knockout solenoid 50 may be operated at any time by the actuation of knob 40 through contacts 51 and 52 as above explained.

Operation and method of use

For convenience in the discussion and explanation of applicant's method and apparatus, it will be assumed that we are dealing with a transit system having a route three miles long with a fare of 15 cents. The route is then divided up into 5 cent distances of one mile each. By the use of applicant's invention, a passenger embarking will deposit 15 cents in the fare box, and he will be returned two nickels change if he should disembark at any point within the first mile, one nickel if he disembarks after riding more than one but less than 2 miles, and no nickel should he disembark after traveling 2 miles or more. Applicant's apparatus accomplishes this desired result in the following manner:

Upon entering the vehicle door 1, the passenger deposits the full fare of 15 cents in a suitable fare box 3. This fare box will thereupon dispense a card 6 to the passenger, or if desired, ticket 6 may be manually distributed by the vehicle operator. While no specific card dispensing mechanism is herein shown, it is contemplated that any commercial ticket vending machine be used. The particular structure of such vending mechanism forms no part of the present invention. The passenger then places the card 6 in the groove of the arms 12 in the card punch mechanism 4. Operation of the handle 21 by the passenger will perforate the card as shown at 9, 10. The position of the notch along the edge 8 of the card 6 is determined by the position of the frame 11 relative to the punch member 19 at the time of operation of the handle 21. As the vehicle progresses along its route, the lead screw 14 moves the frame 11 to the left in Figure 2 as shown by the arrow. Thus, at the beginning of the bus route, cards would be punched toward the left end of edge 8, with the notch progressing on subsequent cards to a position at the right end of edge 8 on cards punched near the end of the bus route. After perforating the card 6, the passenger removes it from the arms 12 and retains it until he disembarks. It is, of course, possible to combine the fare box and card punch with the card dispenser in one box so that the passenger receives a perforated card upon deposit of the fare.

When the passenger desires to leave the bus, he places the perforated card 6 in the grooves of the arms 24 of the change return mechanism 5 in such a manner that the notch 9, 10 is at the top and the cutaway edge 7 mates with the corner 25 of the frame 23. The passenger then presses handle 40 inwardly, forcing contacts 41, 42 and 43 against the card 6. Depending upon the position of the perforation in card 6, the contacts 41, 42, and 43 will individually be allowed to strike plate 44 or, will be prevented from so doing by the interference of card 6. Figures 4, 5, 6 and 7 show in detail, the various positions of the card 6 with respect to the contacts 41, 42 and 43. In Figure 4, both of the contacts 41 and 42 are allowed to pass through the card notch and to strike plate 44, while contact pin 43 is blocked by the card. As shown in Figure 11, contacts 41 and 42 are respectively connected to solenoids 36 and 37. Thus, in the position shown in Figure 4, both solenoids 36 and 37 will be energized. Energization of solenoid 36 will actuate Bowden wire 34 which will in turn actuate change tube 30 to deposit a nickel in the chute 32, and in a similar fashion, energization of solenoid 37 will actuate change tube 31 to deposit another nickel in the chute 32. With the card in the position shown in Figure 4, therefore, the passenger will receive two nickels in change as he disembarks from the bus.

In the position of the card shown in Figure 5, the contact 41 no longer is allowed to touch plate 44. In this position, only contact 42 is allowed to pass the card and thus only solenoid 37 is energized. Therefore, in the position of the card shown in Figure 5, the passenger will receive only one nickel in change when he disembarks.

In the position of the card shown in Figure 6, only the contact 43 is allowed to touch contacts 44. As is shown in Figure 11, the closing of contacts 43 and 44 energizes the solenoid of relay 46 thereby opening the switch bar 57 and preventing any operation of solenoids 36 and 37. As may be seen from Figures 3, 4, 5 and 6, the card holder 23, and therefore the card 6, is constantly traveling at a slow rate of speed past the fixed support 38 in a right-hand direction in synchronism with the travel of the card carrier 11 of the card punch mechanism. It is thus apparent that an initial distance is provided during which two nickels change are returned. If immediately after punching the card, the passenger should desire to leave the bus and the card is placed in the change-return mechanism 5, then both contacts 41 and 42 would pass through the perforation in the card and operate solenoids 36 and 37. Energization of both solenoids would be possible until such time as the card holder 23 will have moved the card 6 to the right far enough so that contact 41 no longer will pass through the perforation. At such time, the bus will have traveled, since the passenger embarked, a complete first mile. For a second distance, the contact 42 will alone pass through the perforation energizing solenoid 37. In the structure shown, this second distance, or second range, is limited by movement of the frame 23 to the right sufficient to allow pin 43 to pass through the aperture to touch plate 44. At such time, if the card were placed in the change return mechanism 5, both contacts 42 and 43 would touch plate 44. However, as is seen in Figure 9, the contact pin 43 is somewhat longer than contact pins 41 and 42. This extra length allows contact 43 to hit plate 44 before either of the other two contacts, and thus, when the change return mechanism is operated at the end of distance 2 or during a third distance, the relay 46 will open switch bar 57 to prevent energization of either solenoid 36 or 37. As shown in Figure 6, after passing through the second range and during the third period of travel, either contact pin 43 or none touches plate 44. During this time, therefore, no change is returned.

Provision is made for the re-setting of the card punch and change return mechanism at the end of the vehicle route. As shown in Figure 8, the thread portion 58 that mates with the lead screw 26 has a diameter larger than the screw. This allows the frame 23 to be carried along by the top of the threads on the screw 26 and also allows the frame 23 to be lifted away from contact with the screw 23 and moved back to its starting position.

A similar arrangement is provided in the card punch mechanism at 13, 14.

It will be readily apparent to those skilled in the art that modifications of the shape of the perforation of the card 6 and similar modification in the arrangement of the pins 41, 42 and 43 could be made within the scope of the invention. For example, the pins could be laid in a flat sequence rather than staggered as shown, with the solenoid 36 actuating a change tube which dispenses dimes instead of nickels. In such an arrangement, the perforation which could be square or round would during the first distance of travel allow passage of pin 41 only, thus dispensing one dime. During the second distance of travel, the perforation would align itself with pin 42, thus allowing energization of solenoid 37 and the return of a nickel. Passage of the perforation to the end of the second range would, as before, allow passage of the pin 43 through the card with subsequent operation of solenoid 46 which prevents operation of solenoids 36 and 37. Thereafter no pin would reach plate 44, and likewise there would be no operation of the change making solenoids.

It is recognized that a severe problem in systems of the type under discussion is that of counterfeiting and other similar cheating by passengers. Applicant's structure has been designed to reduce such practices to a minimum. The relatively greater length of pin 43 is designed to prevent the passenger from cutting away the left edge of the perforation edge shown in Figures 4 through 6 in order to allow contacts 41 and 42 to hit contact 44 to release change. Due to its extra length, the pin 43 will contact the member 44 first upon operation of the handle 40 and the relay 46 will immediately operate to open switch bar 57 preventing any subsequent operation of solenoids 36 and 37. The clipped corner 7 of the card 6, in cooperation with the member 25, allows the card to be introduced into the change return mechanism in only one position. This arrangement prevents a passenger from merely reversing the card 180° which would in some cases allow return of change. It is apparent that the perforation in the card 6 may be punched in the central portion of the card instead of at an edge. Such an arrangement would make it more difficult to modify the card fraudulently.

As a further safeguard, the card 6 could be made of varying colors on successive days so that the use of homemade cards could be more easily perceived. A further precaution which could be taken to prevent the use of homemade cards would be to adjust the card holders 11 and 23 at the beginning of each day or at the beginning of each trip to punch a different section of the card. Since the card is rather large with relation to the distance of movement required to operate the various solenoids throughout a complete route, this technique would be quite effective.

The use of my invention will also eliminate the need for separate "transfer slips" since a passenger receiving his colored card 6 could be allowed to use it as a transfer and forego getting change when he disembarks to change busses. If this use were to be made of the cards, they would, of course, be time stamped as they are dispensed by the fare box or operator.

From the foregoing description, it will be seen that applicant has provided a novel and valuable method and apparatus for the equitable apportionment of transit fares. It will, of course, be understood that modification and variations may be effected without departing from the scope of the novel concepts of the present invention.

I claim as my invention:

1. For use in a transit vehicle, a vehicle carried card marking device for marking on an inserted card indicia representing the instantaneous position of the vehicle and including a card holding means and a card marking means, relatively movable with respect to one another, the movable means of said relatively movable means having a driven connection with the wheels of the vehicle, which connection thereby controls the card marking device to indicate the instaneous position of the vehicle by an indicia marked on the card, a second device for receiving said card including a card holding means and a card sensing means to sense the change of said instantaneous position representing the distance travelled by the vehicle, said card holding and sensing means being relatively movable with respect to one another, the movable means of said relatively movable means having a driven connection with the wheels of the vehicle which connection thereby controls said second device to sense the said change in position, and coin dispenser means controlled by said card sensing means to eject a selected number of coins according to the difference in positions of the vehicle.

2. For use in a transit vehicle, a vehicle carried card marking device for marking on an inserted card indicia representing the instantaneous position of the vehicle comprising a movable card frame for receiving a card and having a driven connection with the wheels of the vehicle to move the card frame in accordance with the position of the vehicle and a card perforating mechanism having a punch guide and a punch guided thereby for perforating a reference aperture in the card to indicate the instantaneous position of the vehicle on the card, a second device for receiving said card including a card holding means and a card sensing means to sense a change of said instantaneous position representing the distance travelled by the vehicle, said card holding and sensing means being relatively movable with respect to one another, the movable means of said relatively movable means having a driven connection with the wheels of the vehicle which connection thereby controls said second device to sense the said change in position, and coin dispenser means controlled by said card sensing means to eject a selected number of coins according to the difference in positions of the vehicle.

3. For use in a transit vehicle, a vehicle carried card marking device for registering on an inserted card indicia representing the instantaneous position of the vehicle comprising a movable card frame for receiving a card and having a driven connection with the wheels of the vehicle to move the card frame in accordance with the position of the vehicle and a card perforation mechanism having a punch for perforating a reference aperture in the card to indicate the instantaneous position of the vehicle on the card, a manual actuating lever connected to said punch for operating said card marking device, a second device for receiving said card including a card holding means and a card sensing means to sense the change of said instantaneous position representing the distance travelled by the vehicle, said card holding and sensing means being relatively movable with respect to one another, the movable means of said relatively movable means having a driven connection with the wheels of the vehicle, which connection thereby controls said second device to sense the said change in position, and coin dispenser means controlled by said card sensing means to eject a selected number of coins according to the difference in positions of the vehicle.

4. For use in a transit vehicle, a vehicle carried card marking device for marking on an inserted card indicia representing the instantaneous position of the vehicle and including a card holding means and a card marking means relatively movable with respect to one another, the movable means of said relatively movable means having a driven connection with the wheels of the vehicle which connection thereby controls the card marking device to indicate the instantaneous position of the vehicle by an indicia marked on the card, a second device for receiving said card comprising a movable card frame having a driven connection with the wheels of the vehicle for movement in accordance with the position of the vehicle and a sensing head having a plurality of contact pins on one side of said card frame and a contact plate on the other side of said card frame, said pins and said plate being engageable with one another and operatively cooperable with said card to sense the change in said instantaneous position representing the distance travelled by the vehicle, and coin dispenser means controlled by said second device to eject a selected number of coins according to the difference in positions of the vehicle.

5. In a transit vehicle, a vehicle carried card marking device for marking on an inserted card indicia representing the instantaneous position of the vehicle and including a card holding means and a card sensing means relatively movable with respect to one another, the movable means of said relatively movable means having a driven connection with the wheels of the vehicle, which connection controls the card marking device to indicate the instantaneous position of the vehicle by an indicia marked on the card, a second device for receiving said card including a card holding means and a card sensing means to sense the change of said instantaneous position representing the distance travelled by the vehicle, said card holding and sensing means being relatively movable with respect to one another, the movable means of said relatively movable means having a driven connection with the wheels of the vehicle, which connection thereby controls said second device to sense the said change in position, coin dispenser means including a plurality of coin receptacles and a corresponding plurality of solenoid operated control means for regulating the ejection of coins therefrom, and circuit means for said coin dispenser means controlled by said second device, whereby a selected number of coins are dispensed according to the change in position of the vehicle.

6. In combination, a wheeled vehicle, card marking means including a first movable card carrying member having a driven connection with the wheels of the vehicle and being continuously adjustable in response to movement of the vehicle, marking means for marking indicia on the card indicating the instantaneous position of the vehicle, card analyzing means including a second movable card carrying member having a driven connection with the wheels of the vehicle and being continuously adjustable in response to movement of the vehicle and further including sensing elements operatively cooperable with the indicia for sensing the relative change in said instantaneous position, and coin dispenser means controlled by said sensing elements to eject a selected number of coins according to the change in position of the vehicle.

References Cited in the file of this patent
UNITED STATES PATENTS

| 363,031 | Westbrook | May 17, 1887 |
| 682,197 | Hollerith | Sept. 10, 1901 |
| 1,734,283 | Baur et al. | Nov. 5, 1929 |
| 1,737,422 | Hulme | Nov. 26, 1929 |
| 1,752,784 | Collins | Apr. 1, 1930 |
| 1,976,585 | Tauschek | Oct. 9, 1934 |
| 2,184,914 | Gramann | Dec. 26, 1939 |
| 2,659,470 | Du Pont | Nov. 17, 1953 |